C. H. YOUNG.
COUCH BED.
APPLICATION FILED DEC. 16, 1911.

1,020,630.

Patented Mar. 19, 1912.

2 SHEETS—SHEET 1.

Witnesses;
M. K. Betts
E. W. Churchill

Inventor,
Clarence H. Young;
By
A. B. Upham,
Attorney.

C. H. YOUNG.
COUCH BED.
APPLICATION FILED DEC. 16, 1911.

1,020,630.

Patented Mar. 19, 1912.

2 SHEETS—SHEET 2.

Witnesses,

Inventor,
Clarence H. Young;
By
Attorney.

UNITED STATES PATENT OFFICE.

CLARENCE H. YOUNG, OF BOSTON, MASSACHUSETTS.

COUCH-BED.

1,020,630.  Specification of Letters Patent.  Patented Mar. 19, 1912.

Application filed December 16, 1911. Serial No. 666,294.

*To all whom it may concern:*

Be it known that I, CLARENCE H. YOUNG, a citizen of the United States, and a resident of Boston, in the county of Suffolk and Commonwealth of Massachusetts, have invented certain new and useful Improvements in Couch-Beds, of which the following is a full and exact description.

This invention relates to that type of beds in which a movable section is superposed upon a stationary section to serve as a couch, and in which such movable section is put beside the stationary section in order that both together shall compose a full-width bed. Such movable section is usually supported upon a swinging frame carried by the stationary section, so that the movable section swings through an arc of a circle in rising from the stationary section and descending to the floor, and vice versa. When the movable section thus drops to the floor and also when it descends to the stationary section, it causes a considerable jar, especially when it is loaded with mattress and blankets. Further, to lessen the energy required in raising the movable section, counterbalancing springs are employed in such type of couch beds.

The objects of my invention are, first, to provide a shock absorber which will lessen or wholly obviate, the jar caused by the descent of the movable section; and, second, to construct an improved form of counterbalancing spring.

For the shock absorber, I have arranged a single cylinder and plunger in such a manner that it will stop the jar at both descents of the movable section, leaks being provided for the cylinder adapted to permit the air to enter and leave the same slowly enough to let the movable section descend quite gradually.

Figure 1:
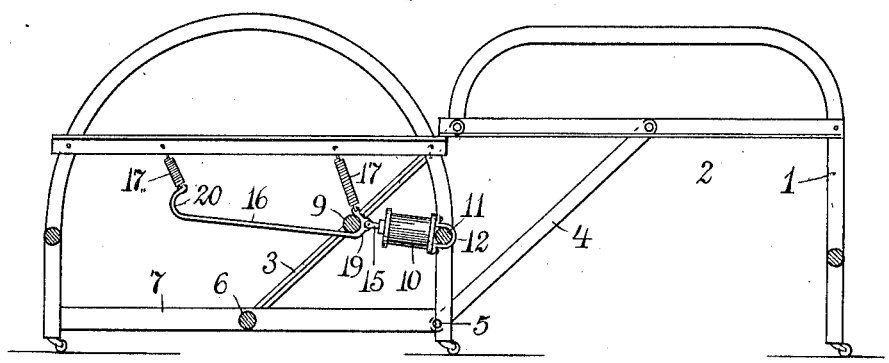
Figure 2:
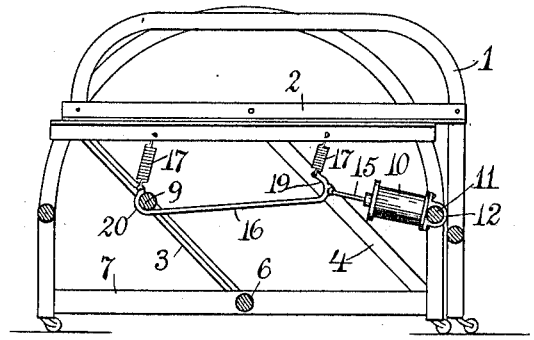
Figure 3:
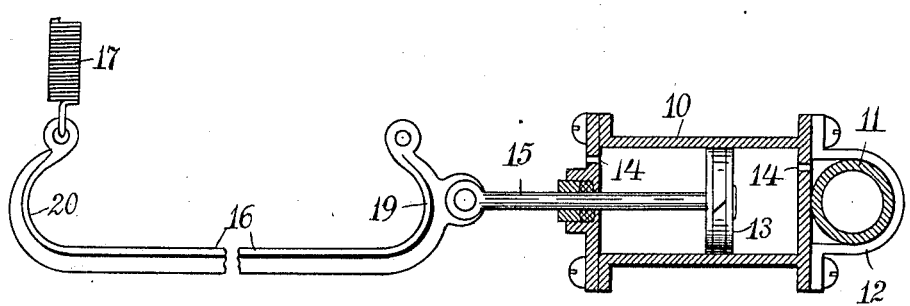
Figure 4:
Figure 5:
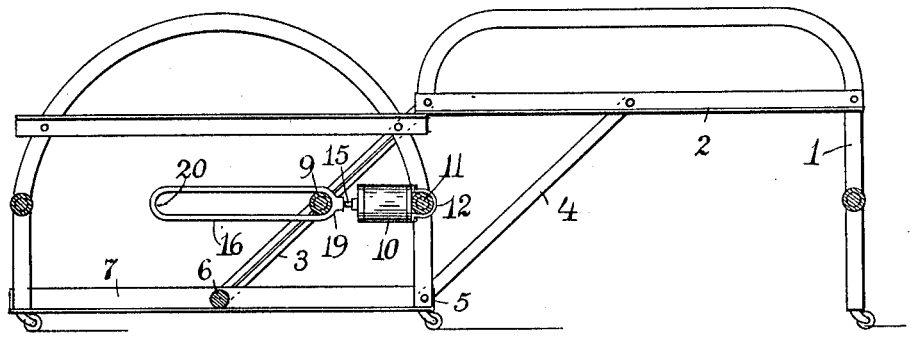
Figure 6:
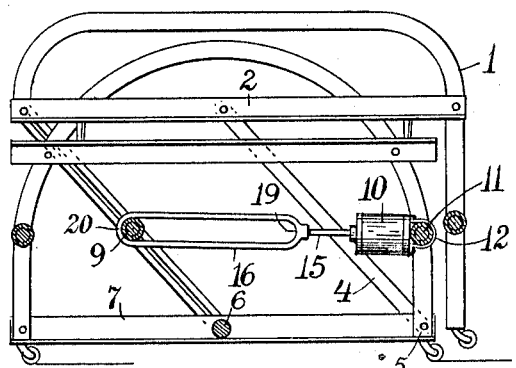
Figure 7:
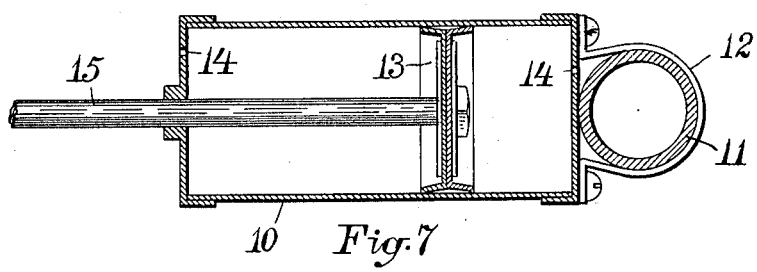

In the drawings forming part of this specification, Figure 1 is a cross section of a couch bed embodying one form of my invention. Fig. 2 is a cross section of the same in a closed condition. Fig. 3 is a sectional view of the shock absorber. Fig. 4 is a detail view of a slightly different form. Fig. 5 is a cross section of a couch bed extended, showing my preferred form of shock absorber. Fig. 6 is a cross section of the same in a closed condition. Fig. 7 is a sectional view of the last-named shock absorber.

The movable section embracing end-frame members 1 and 2, is supported upon the parallel arms 3, 4, which are pivoted at their upper ends to the movable section, and are attached at their lower ends to the stationary section at 5 and to the rock shaft 6, respectively; the said shaft being rotatably supported by the cross bars 7 of the stationary section. Said arms 3 are held from yielding to the strain of the mattress of the movable section by the spreader bar 9, in the usual manner.

In the construction set forth in Figs. 1, 2 and 3, the shock absorber 10 is confined to the side rail 11 by means of a strap 12 loosely encircling said rail and permitting said cylinder to oscillate thereon. A slow reciprocation of the plunger 13 within said cylinder is permitted by the small vents or passages 14. The piston rod 15 is connected with a bar or member 16 supported by tension springs 17; said member comprising a bar having terminal stops 19, 20 adapted to be met by the spreader bar 9 as the latter approaches each end of its swing; and no matter how forcibly the movable section may be started, it is first brought to a full stop and then let down gradually. Hence, when the swinging frame, consisting of the said bar 9 and the arms 3, swings to the right for depositing the movable section upon the floor, said stop 19 is met by the spreader bar 9 and the plunger 13 forced within the cylinder 10 toward the side bar 11. This brings the movable section almost to a dead rest, and then as the air escapes from in front of the plunger and rushes in behind it, said section settles slowly down to its lowermost position. In the same manner, when the movable section is to be superposed upon the stationary section and the arms 3 and 4 are swung over toward the left, the spreader bar 9 engages the hook or stop 20 and thereby carries the member 16 for a short distance toward the left and slightly downward. The piston rod 15 is now drawn outward by said member 16 and the plunger forced toward the other end of the cylinder 10; the gradual escape of air from in front of the plunger and its inlet behind the latter acting as before to cause the movable section to slowly settle to its place without shock or jar.

The function of the springs 17 is two fold; first, to support the member 16 in proper position to be engaged by the spreader bar near the ends of its movements, and, second, to resiliently support the movable section in its lowermost positions. That this is done is evident from inspection of Figs. 1 and 2, Fig. 1 showing how the spring attached to the stop 19 is elongated by the pressure of the spreader bar 9 under the weight of the movable section, and Fig. 2 showing how the other spring 17 is elongated by the pressure of the spreader bar at the closed condition of the movable section. The tension thus put upon said springs acts to resiliently support the movable section when in its depressed positions, and hence to make its elevation much easier.

Although I have shown the cylinder 10 as provided with a head, and hence double-acting, such head may be dispensed with and the effect of the plunger will be as before.

By having the stops 19, 20 on the bar or member 16 a sufficient distance apart to enable the arms 3 to swing through substantially three quarters of their oscillation before the spreader bar 9 reaches either of said stops, the shock absorber plunger gives absolutely no resistance to the movements of the movable section until the latter is sinking under gravity to its position of rest.

If the springs 17 were dispensed with and some other arrangement of springs employed for resiliently supporting the movable section, then it would be desirable to form the member 16 as a loop rigid with the piston rod 15, as illustrated in Fig. 4. By thus forming the member 16 as a loop, and especially a curved loop as shown, the shock absorber can be located on the side rail 11 half way between its ends, and so stop the movable section equally at both ends; for where a single shock absorber is used at one end of the couch bed, the opposite end of the movable section is given a marked wrench or torsional strain. Of course, a shock absorber can be applied to each end of the bed, but this adds slightly to the expense.

In the preferred form of my invention, that shown in Figs. 5, 6 and 7, the member 16 is not supported by springs, but is confined to the spreader bar 9 by forming said member as a complete loop, the ends of said loop composing the stops 19 and 20. Moreover, said member is made rigid with the piston 15, instead of being pivotally connected therewith as in the first-described construction. Otherwise, there is but little difference between the two, and the operation is substantially the same. The spring counterbalance for the movable section may be the same as that shown in Figs. 1 and 2, being a separate member 16 disconnected from the shock absorber and supported by springs 17 as already described, and acting the same way.

What I claim as my invention and for which I desire Letters Patent is as follows, to wit:—

1. The combination with a couch bed comprising a stationary section, a movable section, and a swinging frame carried by the stationary section and supporting the movable section, of means actuated by the movable section near the termination of a downward movement for forcing a fluid through a limited space.

2. The combination with a couch bed comprising a stationary section, a movable section and a swinging frame carried by the stationary section and supporting the movable section, of a cylinder having a plunger movable therein, one of said members having a restricted passage through it whereby the movement of said plunger forces a fluid through said passage, and connections whereby the movements of said movable section reciprocates said plunger within said cylinder.

3. The combination with a couch bed comprising a stationary section, a movable section, and a swinging frame carried by the stationary section and connected with the movable section, of a cylinder suitably anchored, a plunger therein, one of said parts having a restricted passage, whereby the movement of said plunger forces a fluid through said passage, a member having widely separated stops and connected with said plunger, and a member carried by said swinging frame and adapted near the ends of the latter's oscillations to engage said stops and move said plunger.

4. The combination with a couch bed comprising a stationary section, a movable section, and a swinging frame carried by the stationary section and connected with the movable section, said stationary section having a side rail and said swinging frame having a spreader bar, of a cylinder loosely held by said side rail and having a plunger and piston rod, a restricted passage being provided for the passage of a fluid displaced by said plunger, and a member having widely separated stops adapted to be engaged by said spreader bar and to operate said piston and plunger.

5. The combination with a couch bed comprising a stationary section, having a side rail, a movable section, and a swinging frame embracing a spreader bar, of a cylinder loosely held by said side rail, a plunger in said cylinder, one end thereof having a passage for the slow movement of a fluid displaced by said plunger, and a member consisting of an elongated loop within which is said spreader bar, said member being connected with said plunger and adapted to be reciprocated by the movements of said swinging frame and bar.

6. The combination with a couch bed comprising a stationary section having a side rail, a movable section, and a swinging frame connected with said movable section and pivotally supported by the stationary section, said frame embracing a spreader bar, of a cylinder loosely held by said side rail, a plunger movable within said cylinder, a piston connected with said plunger, and an elongated loop penetrated by said spreader bar and rigidly connected with the outer end of said piston, said cylinder being terminally apertured for permitting a restricted passage of air to and from the same.

7. The combination with a couch bed comprising a stationary section, a movable section, and a swinging frame connected with said movable section and pivotally supported by the stationary section, said frame embracing a spreader bar, of a substantially horizontal member, and springs supporting its extremities, said member being located beneath said spreader bar and adapted to receive the pressure thereof when the said frame swings to each of its extremes of movement.

In testimony that I claim the foregoing invention, I have hereunto set my hand this 14th day of December, 1911.

CLARENCE H. YOUNG.

Witnesses:
A. B. UPHAM,
I. G. KEENAN.

---

Copies of this patent may be obtained for five cents each, by addressing the "Commissioner of Patents, Washington, D. C."